(12) United States Patent
Koami

(10) Patent No.: US 11,175,782 B2
(45) Date of Patent: Nov. 16, 2021

(54) INPUT CONTROL DEVICE AND INPUT CONTROL METHOD

(71) Applicant: Mitsubishi Electric Corporation, Tokyo (JP)

(72) Inventor: Yasuaki Koami, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/040,148

(22) PCT Filed: May 11, 2018

(86) PCT No.: PCT/JP2018/018339
§ 371 (c)(1),
(2) Date: Sep. 22, 2020

(87) PCT Pub. No.: WO2019/215915
PCT Pub. Date: Nov. 14, 2019

(65) Prior Publication Data
US 2021/0019003 A1    Jan. 21, 2021

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04104* (2013.01)

(58) Field of Classification Search
None
See application file for complete search history.

(56) References Cited

U.S. PATENT DOCUMENTS

| | | | |
|---|---|---|---|
| 2013/0328818 A1 | 12/2013 | Igari | |
| 2018/0024649 A1* | 1/2018 | Uno | G06F 3/0416 345/174 |
| 2020/0233521 A1 | 7/2020 | Sasaki et al. | |

FOREIGN PATENT DOCUMENTS

| | | |
|---|---|---|
| EP | 2 237 142 A1 | 10/2010 |
| JP | 2011-113221 A | 6/2011 |

(Continued)

OTHER PUBLICATIONS

Office Action dated Aug. 24, 2021 in German Patent Application No. 11 2018 007 216.9 with an English Translation.

*Primary Examiner* — Stephen T. Reed
(74) *Attorney, Agent, or Firm* — Birch, Stewart, Kolasch & Birch, LLP.

(57) ABSTRACT

A touch information acquiring unit acquires touch information including the positions of touch points and the electrostatic capacitances of the touch points. A touch means determining unit determines whether each of the touch points is touched by a finger or by an input device with which a finger is in contact using the touch information, and thereby determines whether there is a touch point touched by the input device with which the finger is in contact. In a case where it is determined that there is a touch point touched by the input device with which the finger is in contact, and the total number of touch points on a touch panel exceeds an effective upper limit number, an operation determining unit determines that one or more touch points touched by fingers are points where touches are to become ineffective, and regards the one or more touch points as points from which touches are released, the number of the one or more touch points being equal to a number by which the total number exceeds the effective upper limit number.

9 Claims, 12 Drawing Sheets

(56) References Cited

FOREIGN PATENT DOCUMENTS

WO    WO 2016/166793 A1    10/2016
WO    WO 2019/073544 A1    4/2019

\* cited by examiner

- Touch Is Effective
× Touch Is Ineffective

- Touch Is Effective
× Touch Is Ineffective

- Touch Is Effective
× Touch Is Ineffective

- Touch Is Effective
× Touch Is Ineffective

● Touch Is Effective
✗ Touch Is Ineffective

● Touch Is Effective
✗ Touch Is Ineffective

- Touch Is Effective
- Touch Is Ineffective

- Touch Is Effective
- Touch Is Ineffective

- Touch Is Effective
- Touch Is Ineffective
- Not Reflected in Process

- Touch Is Effective
- Touch Is Ineffective
- Not Reflected in Process

INPUT CONTROL DEVICE AND INPUT CONTROL METHOD

TECHNICAL FIELD

The present invention relates to a device for controlling acceptance of input operation.

BACKGROUND ART

From the perspective of design or operability, there is a demand for implementation of both a touch panel and a mechanical switch. As such a mechanical switch, input devices like a knob placed on a touch panel are known. When a user operates such an input device, the operation by the user is detected as a contact between the input device and the touch panel at multiple points.

In a device using a touch panel, there is an upper limit on the number of touches that can be recognized as effective touches due to factors such as processing capacity. Therefore, there are cases where the user cannot perform input operation using the input device since touch points touched by the input device are not recognized as points where touches are effective in a case where there are many touch points touched by fingers. For example, Patent Literature 1 describes a touch panel device for detecting multiple touch inputs that are made simultaneously, in which an upper limit value of the number of detectable touch inputs can be changed even at the time of touch input operation.

CITATION LIST

Patent Literatures

Patent Literature 1: JP 2011-113221 A

SUMMARY OF INVENTION

Technical Problem

Even in a case where the upper limit value of the number of detectable touch inputs can be changed as in Patent Literature 1, there are cases where input operation using the input device cannot be performed in a case where the total number of touch points touched by fingers and touch points touched by the input device is larger than a changed upper limit value.

The present invention has been made to solve the above problem, and an object of the invention is to obtain an input control device capable of prioritizing input operation using an input device in a case where there are touch points the number of which exceeds an effective upper limit number.

Solution to Problem

An input control device according to the present invention is for co trolling acceptance of input operation touch panel on which an input device for forming multiple touch points is placed, the input control device including: processing circuitry to acquire touch information including one or more positions of respective touch points end one or more electrostatic capacitances of the respective touch points; to determine whether each of the touch points is touched by a finger or by the input device with which a finger is in contact using the touch information, and thereby determine whether there is a touch point touched by the input device with which the finger is in contact; and to, in a case where it is determined that there is a touch point touched by the input device with which the finger is in contact and a total number of touch points on the touch panel exceeds an effective upper limit number, determine that one or more touch points touched by respective fingers are points where respective touches are to become ineffective, and regard the one or more touch points as points from which respective touches are released, the number of the one or more touch points being equal to an excess number by which the total number exceeds the effective upper limit number.

Advantageous Effects of Invention

According to the present invention, input operation using the input device can be prioritized in a case where there are touch points the number of which exceeds the effective upper limit number.

DESCRIPTION OF EMBODIMENTS

To describe the present invention further in detail, modes for carrying out the present invention will be described below by referring to the accompanying drawings.

First Embodiment

Figure 1:
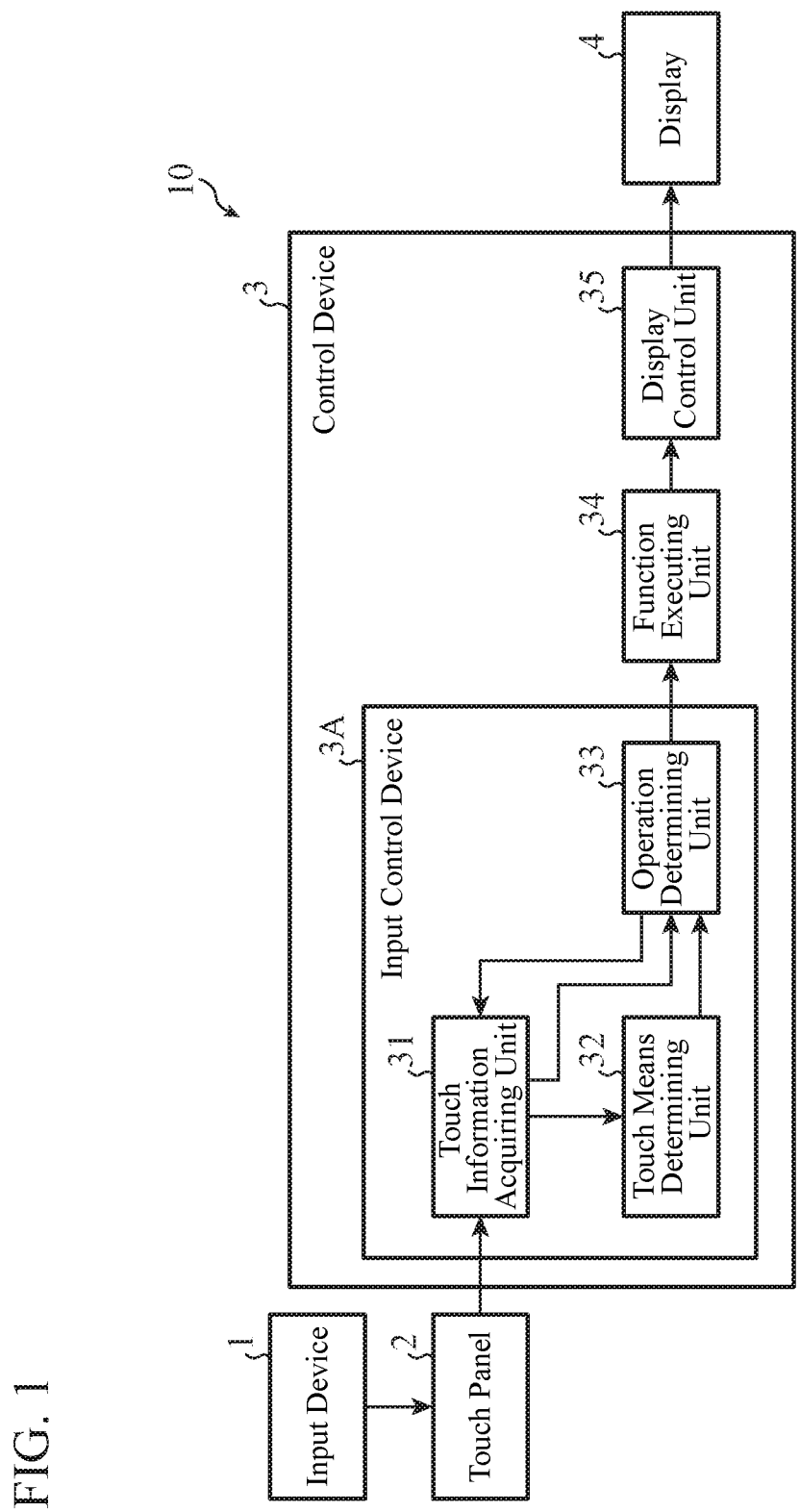
FIG. 1 is a diagram illustrating a configuration of a display input device according to a first embodiment.

FIG. 1 is a diagram illustrating a configuration of a display input device 10 according to a first embodiment. In FIG. 1 also illustrated is an input device 1 used for the display input device 10. The display input device 10 includes a touch panel 2, a control device 3, and a display 4. The touch panel 2, the control device 3, and the display 4 may be integrated as the display input device 10, or may be independent devices and function as the display input device 10 by being communicably connected to each other. The display input device 10 is mounted on, for example, a vehicle. The display input device 10 is operated by a user and thereby displays, for example, a map image for navigation or the like.

Figure 2A:
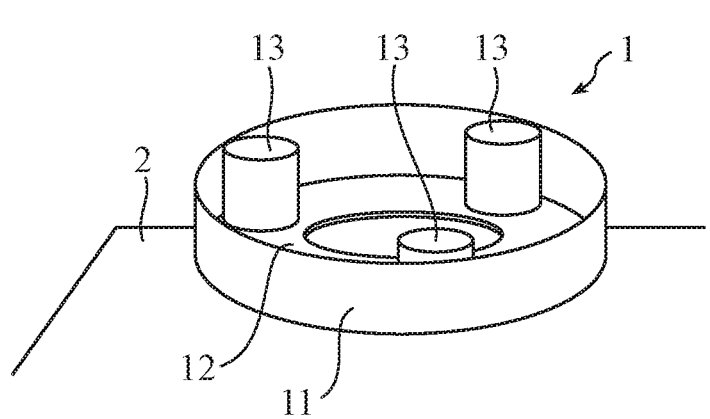
FIG. 2A is a perspective view illustrating an example of an input device.
Figure 2B:
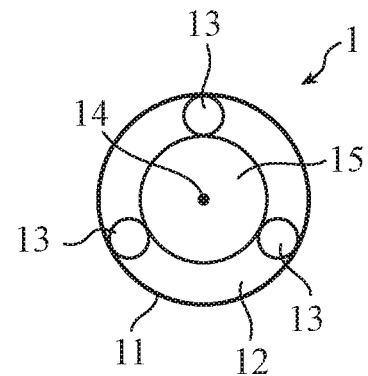
FIG. 2B is a plan view illustrating the example of the input device.

FIG. 2A is a perspective view illustrating an example of the input device 1. In the illustration of FIG. 2A, the input device 1 is placed on the touch panel 2. FIG. 2B is a plan view illustrating the example of the input device 1.

The input device 1 has a conductive portion that a user's finger contacts when the user places a hand on the input device 1. The portion includes an outer circumferential conductive portion 11 of a substantially cylindrical shape. A bottom plate 12 of a substantially annular shape made of resin is provided in one of two openings in the outer circumferential conductive portion 11.

The input device 1 includes multiple conductive columns 13 housed in the outer circumferential conductive portion 11. Each of the conductive columns 13 is placed substantially perpendicular to the bottom plate 12. In FIGS. 2A and 2B, an example is illustrated in which three conductive columns 13 are arranged at positions corresponding to the vertices of an equilateral triangle. Each of the conductive columns 13 is electrically connected to the outer circumferential conductive portion 11.

When the input device 1 configured as described above is placed on the touch panel 2, a touch point is formed at each of the positions of the conductive columns 13. Therefore, in a case where there are three conductive columns 13 as illustrated in FIGS. 2A and 2B, the input device 1 forms three touch points on the touch panel 2. Input operation by a user using the input device 1 is converted into the positions of the multiple touch points and thereby input to the display input device 10.

The user can handle the input device 1 like a knob, and thus can rotate the input device 1 around the axial center 14 thereof on the touch panel 2. The user rotates the input device 1 around the axial center 14 thereof on the touch panel 2 for the purpose of adjusting the volume of an audio system, for example. In addition, the input device 1 is attachable to and detachable from the touch panel 2, and the user can freely move the input device 1 on the touch panel 2.

Note that, in FIGS. 2A and 2B, only the main part of the input device 1 is extracted and illustrated. Therefore, the input device 1 may include a conductive lid (not illustrated in FIG. 2A nor 2B). The lid has a substantially annular shape and closes the opening, of the two openings in the outer circumferential conductive portion 11, where the bottom plate 12 is not provided.

Incidentally, even when the input device 1 is placed on the touch panel 2, the touch panel 2 can be seen from a hollow portion 15 provided around the axial center 14 of the input device 1.

The user's finger or the input device 1 contacts the touch panel 2. The touch panel 2 is an electrostatic capacitive touch panel.

As illustrated in FIG. 1, the control device 3 includes an input control device 3A, a function executing unit 34, and a display control unit 35. The input control device 3A controls acceptance of input operation via the touch panel 2. The input control device 3A includes a touch information acquiring unit 31, a touch means determining unit 32, and an operation determining unit 33.

When the touch panel 2 is touched, the touch information acquiring unit 31 acquires touch information by detecting the position of the touch point, the electrostatic capacitance of the touch point, the number of touch points, the order of touching, gestures, and the like. The position of a touch point indicates coordinates on the touch panel. Moreover, a gesture is a continuous movement of a touch point such as a flick or a swipe.

The touch information includes the position of the touch point, the electrostatic capacitance of the touch point, the number of touch points, the order of touching, gestures, and the like. Note that the number of touch points does not need to be included in the touch information since, for example, the number of touch points naturally becomes clear from how many pieces of information about the position of a touch point are included.

The touch information acquiring unit 31 outputs the acquired touch information to the touch means determining unit 32 and the operation determining unit 33.

The touch means determining unit 32 determines whether a touch point is touched by a finger or by the input device 1 with which a finger is in contact using the touch information output by the touch information acquiring unit 31. Moreover, by making this determination, the touch means determining unit 32 can also determine whether there is a touch point touched by the input device 1 with which a finger is in contact.

The touch means determining unit 32 may further determine whether a touch point is touched by the input device 1 with which no finger is in contact.

An electrostatic capacitance in a case where a touch point is touched by a finger, that is, when the user is directly touching the touch panel 2 with a finger, is denoted as electrostatic capacitance C1. In addition, an electrostatic capacitance in a case where a touch point is touched by the input device 1 with which a finger is in contact, that is, when the user is placing a hand on the input device 1 on the touch panel 2, is denoted as electrostatic capacitance C2. Moreover, an electrostatic capacitance in a case where a touch point is touched by the input device 1 with which no finger is in contact, that is, when the input device 1 is on the touch panel 2 but the user is not placing a hand on the input device 1, is denoted as electrostatic capacitance C3. The electrostatic capacitances C1, C2, and C3 have a relationship in which the electrostatic capacitance C1 is the largest and the electrostatic capacitance C3 is the smallest. Therefore, by setting a first threshold value that enables discrimination between the electrostatic capacitance C1 and the electrostatic capacitance C2, and a second threshold value that enables discrimination between the electrostatic capacitance C2 and the electrostatic capacitance C3, the touch means determining unit 32 can determine by what means a touch point has been made.

The touch means determining unit 32 outputs, to the operation determining unit 33, a determination result indicating by what means the touch point has been made and a determination result indicating whether there is a touch point touched by the input device 1 with which a finger is in contact.

The operation determining unit 33 outputs the touch information output by the touch information acquiring unit 31 to the function executing unit 34.

In addition, in a case where the touch means determining unit 32 determines that there is a touch point touched by the input device 1 with which a finger is in contact, and the total number of touch points on the touch panel 2 exceeds the effective upper limit number, the operation determining unit 33 determines that some of the touch points are points where touches are to become ineffective and regards the some of the touch points as points from which touches are released. In this case, the operation determining unit 33 determines that touch points which are touched by fingers, and the number of which is equal to a number by which the total number of touch points exceeds the effective upper limit number are points where touches are to become ineffective, and regards the touch points, which are determined to be points where touches are to become ineffective, as points from which touches are released. The effective upper limit number is an upper limit value of the number of touches that can be recognized as effective touches, and is set in consideration of, for example, the processing capacity of the display input device 10. If a touch point is a point where a touch is effective, the touch point is reflected in the process in the function executing unit 34. On the other hand, when a touch point is determined to be a point where a touch is to become ineffective, the touch point is notified to the function executing unit 34 as a release target and is reflected in the process in the function executing unit 34. By notifying the function executing unit 34 of the touch point regarded as a point from which a touch is released, the function executing unit 34 is prevented from recognizing that the touch point has been kept pressed down and executing the process based on the recognition.

Note that the operation determining unit 33 may omit to output touch information of the touch point determined to be a point where a touch is to become ineffective, to the function executing unit 34, and the function executing unit 34 may determine that the touch point is a point from which a touch is released by recognizing the touch point whose touch information has stopped from being supplied, and reflect the determination in the process.

Figure 3A:
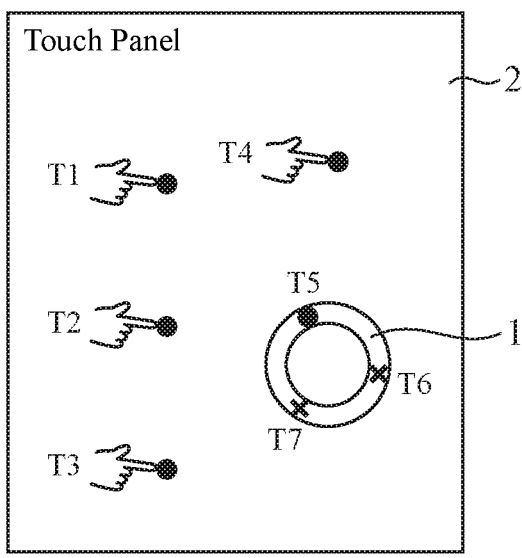
FIGS. 3A and 3B are diagrams for explaining the outline of processes of the first embodiment.
Figure 3B:
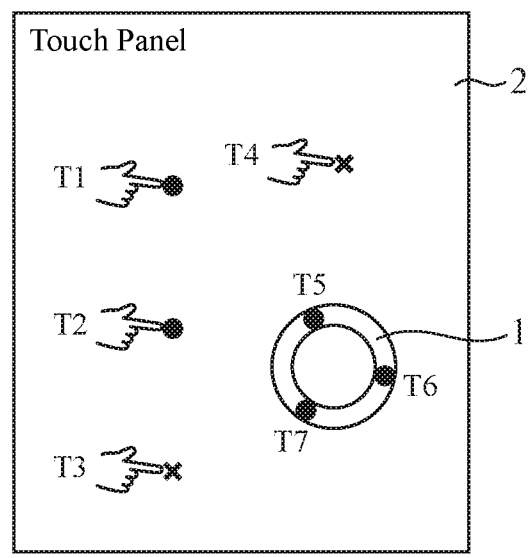

FIGS. 3A and 3B are diagrams for explaining the outline of processes by the touch information acquiring unit 31, the touch means determining unit 32, and the operation determining unit 33. An example will be described in which the effective upper limit number is five, that is, touches up to five points are effective in the display input device 10.

When a user places a hand on the input device 1 while there are touch points T1 to T4 touched by fingers as illustrated in FIG. 3A, only a touch point T5 among touch points T5 to T7 formed by the input device 1 is detected first and becomes a point where a touch is effective.

At this time, the touch means determining unit 32 determines that the touch point T5 is touched by the input device 1 with which a finger is in contact.

As described above, the input device 1 transfers user's input operation by multiple touch points—the three touch points T5 to T7 in the examples illustrated in FIGS. 3A and 3B. In order to accept input operation using the input device 1, the operation determining unit 33 determines that the touch points T3 and T4 are points where touches are to become ineffective, and regards the touch points T3 and T4 as points from which touches are released. As a result, as illustrated in FIG. 3B, all the touch points T5 to T7 formed by the input device 1 are detected and become points where touches are effective, and thus input operation using the input device 1 becomes accepted.

The function executing unit 34 performs a process using the touch information output by the operation determining unit 33. The function executing unit 34, for example, adjusts the volume of the audio system, adjusts the temperature of an air conditioner, or sets the rate of magnification of a display image. The function executing unit 34 notifies the display control unit 35 of the performed process.

The display control unit 35 updates the display image on the display 4 depending on the process performed by the function executing unit 34. For example in a case where the function executing unit 34 adjusts the volume of the audio system, the display control unit 35 causes the display 4 to display an image indicating the adjusted volume.

The display 4 is controlled by the display control unit 35 to display the image. The touch panel 2 is overlaid on the display 4. The display 4 is, for example, a liquid crystal display.

Figure 4A:
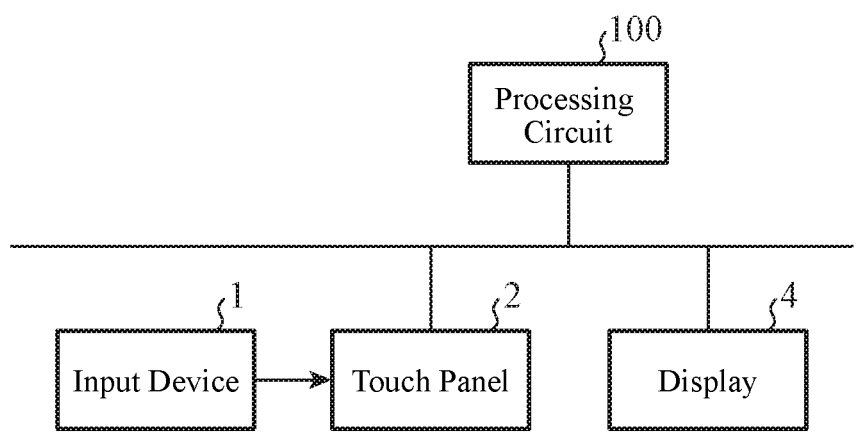
FIGS. 4A and 4B are diagrams each illustrating an exemplary hardware configuration of a control device according to the first embodiment.
Figure 4B:
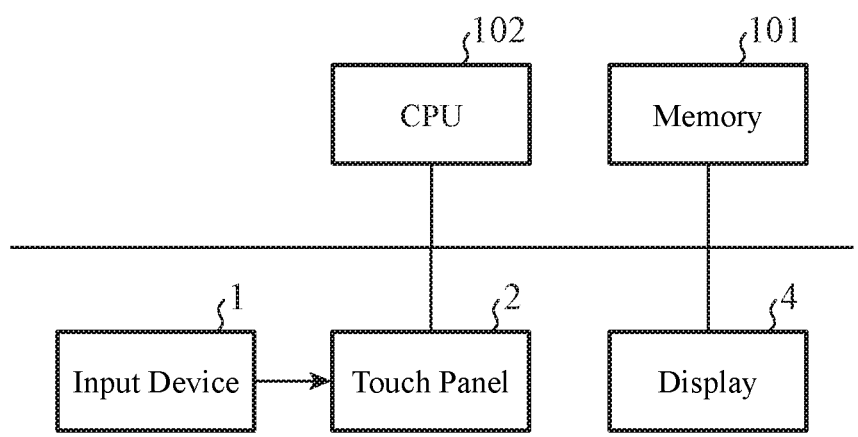

Next, exemplary hardware configurations of the control device 3 will be described by referring to FIGS. 4A and 4B. In FIGS. 4A and 4B, the input device 1, the touch panel 2, and the display 4 are also illustrated.

The functions of the touch information acquiring unit 31, the touch means determining unit 32, the operation determining unit 33, the function executing unit 34, and the display control unit 35 of the control device 3 are implemented by a processing circuit. The processing circuit may be dedicated hardware or a central processing unit (CPU) for executing a program stored in a memory. The CPU may also be referred to as a central processing device, a processing device, an arithmetic device, a microprocessor, a microcomputer, a processor, or a digital signal processor (DSP).

FIG. 4A is a diagram illustrating an exemplary hardware configuration in which the functions of the touch information acquiring unit 31, the touch means determining unit 32, the operation determining unit 33, the function executing unit 34, and the display control unit 35 are implemented by a processing circuit 100 that is dedicated hardware. The processing circuit 100 corresponds to, for example, a single circuit, a composite circuit, a programmed processor, a parallel programmed processor, an application specific integrated circuit (ASIC), a field-programmable gate array (FPGA), or a combination thereof. The functions of the touch information acquiring unit 31, the touch means determining unit 32, the operation determining unit 33, the function executing unit 34, and the display control unit 35 may be implemented by combining separate processing circuits 100. Alternatively, the functions of the units may be implemented by a single processing circuit 100.

FIG. 4B is a diagram illustrating an exemplary hardware configuration in which the functions of the touch information acquiring unit 31, the touch means determining unit 32, the operation determining unit 33, the function executing unit 34, and the display control unit 35 are implemented by a CPU 102 for executing a program stored in a memory 101. In this case, the functions of the touch information acquiring unit 31, the touch means determining unit 32, the operation determining unit 33, the function executing unit 34, and the display control unit 35 are implemented by software, firmware, or a combination of software and firmware. Software and firmware are each described as a program and stored in the memory 101. The CPU 102 reads and executes the program stored in the memory 101 to implement the functions of the touch information acquiring unit 31, the touch means determining unit 32, the operation determining unit 33, the function executing unit 34, and the display control unit 35. More specifically the control device 3 has the memory 101 for storing programs and the likes which result in execution of processes of steps ST1 to ST10 illustrated in a flowchart of FIG. 5 described later. Moreover, it can also be said that these programs cause a computer to execute the procedures or the methods of the touch information acquiring unit 31, the touch means determining unit 32, the operation determining unit 33, the function executing unit 34, and the display control unit 35. Here, the memory 101 corresponds to a nonvolatile or volatile semiconductor memory, such as a random access memory (RAM), a read only memory (ROM), a flash memory, an erasable programmable ROM (EPROM), and an electrically erasable programmable ROM (EEPROM), a disc-like recording medium, such as a magnetic disc, a flexible disc, an optical disc, a compact disc, a mini disc, and a digital versatile disc (DVD), or the like.

Note that a part of the functions of the touch information acquiring unit 31, the touch means determining unit 32, the operation determining unit 33, the function executing unit 34, and the display control unit 35 may be implemented by dedicated hardware, and another part thereof may be implemented by software or firmware. For example, the functions of the touch information acquiring unit 31, the touch means determining unit 32, and the operation determining unit 33 can be implemented by a processing circuit as dedicated hardware, and the functions of the function executing unit 34 and the display control unit 35 can be implemented by a processing circuit reading and executing a program stored in a memory.

As described above, the processing circuit can implement the functions of the touch information acquiring unit 31, the touch means determining unit 32, the operation determining unit 33, the function executing unit 34, and the display control unit 35 described above by using hardware, software, firmware, or a combination thereof.

Figure 5:
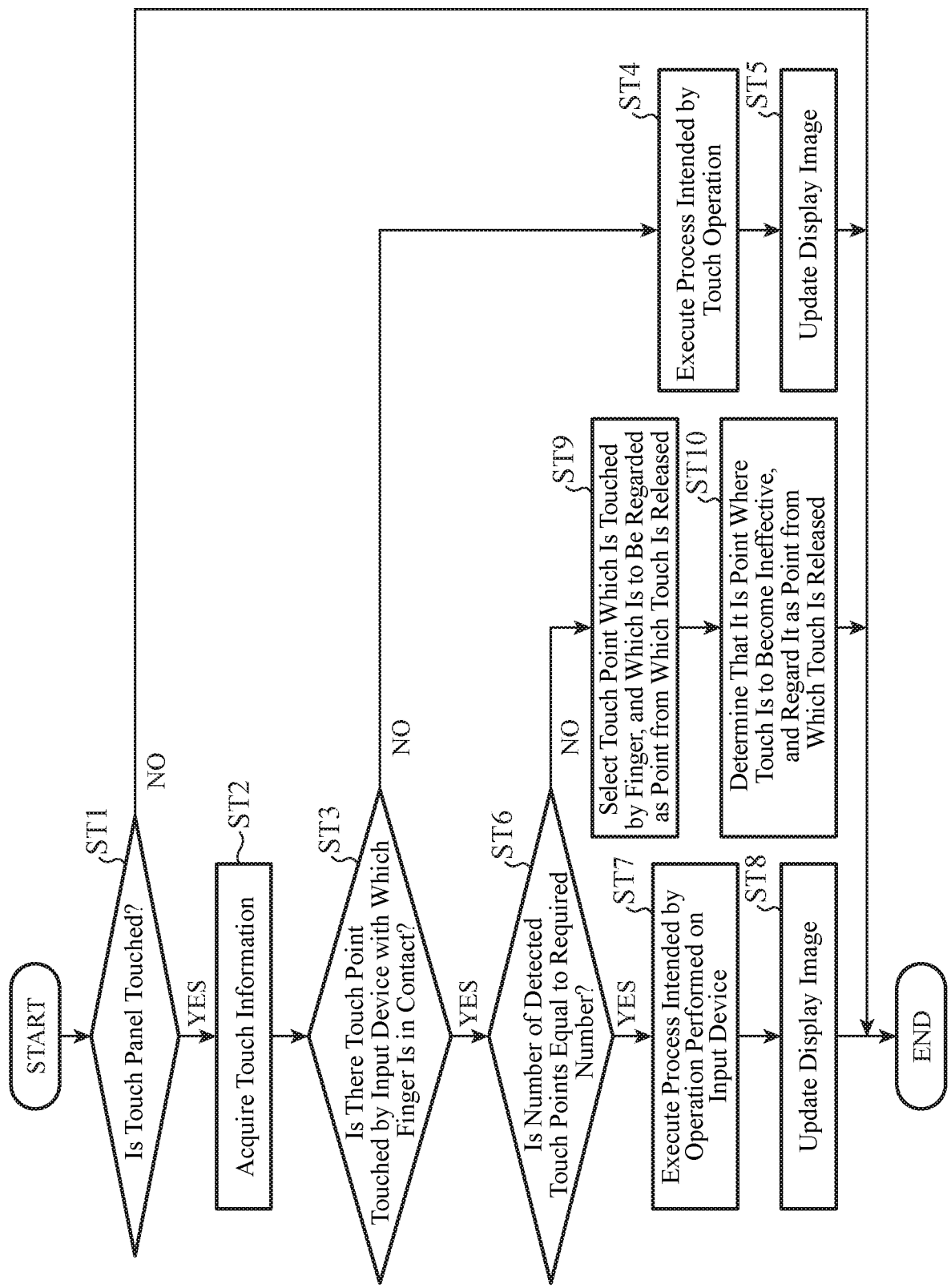
FIG. 5 is a flowchart illustrating an example of processes performed by the control device according to the first embodiment.

Next, an exemplary process by the control device 3 configured as described above will be described by referring to a flowchart illustrated in FIG. 5.

The touch information acquiring unit 31 determines whether the touch panel 2 is touched (step ST1). When the touch panel 2 is touched, the touch panel 2 notifies the touch information acquiring unit 31 of the fact. The touch information acquiring unit 31 receives the notification from the touch panel 2 to determine whether the touch panel 2 is touched.

When the touch panel 2 is not touched (NO in step ST1), the control device 3 ends the process.

Contrarily, when the touch panel 2 is touched (YES in step ST1), the touch information acquiring unit 31 acquires touch information by detecting the positions and the likes of the touch points (step ST2). The touch information acquiring unit 31 outputs the acquired touch information to the touch means determining unit 32 and the operation determining unit 33.

Subsequently, the touch means determining unit 32 determines by what means each touch point is made and whether there is a touch point touched by the input device 1 with which a finger is in contact using the touch information output by the touch information acquiring unit 31 (step ST3).

When there is no touch point touched by the input device 1 with which a finger is in contact (NO in step ST3), the operation determining unit 33 outputs the touch information output by the touch information acquiring unit 31 to the function executing unit 34 as it is. Then, the function executing unit 34 executes the process intended by the touch operation indicated by the touch information (step ST4).

Subsequently, the display control unit 35 updates the display image on the display 4 depending on the process performed by the function executing unit 34 (step ST5).

Contrarily, when there is a touch point touched by the input device 1 with which a finger is in contact (YES in step ST3), the operation determining unit 33 determines whether the number of detected touch points which are touched by the input device 1 with which the finger is in contact is equal to the number of touch points required to enable input operation using the input device 1 (step ST6). The number of touch points required to enable input operation using the input device 1 (hereinafter simply referred to as "required number") corresponds to the number of touch points formed by the input device 1 on the touch panel 2. For example, in the examples illustrated in FIGS. 3A and 3B, the required number is three. In addition, it is assumed that the touch information acquiring unit 31 detects the positions or the likes of touch points only up to the same number as the effective upper limit number. More specifically, in a case where the effective upper limit number is five, the touch information acquiring unit 31 detects the positions and the likes of up to only five touch points in step ST2, and even if a sixth touch point appears, the sixth touch point is excluded from targets of detection of position and the like.

When the number of detected touch points which are touched by the input device 1 with which the finger is in contact is equal to the required number (YES in step ST6), the operation determining unit 33 outputs the touch information output by the touch information acquiring unit 31 to the function executing unit 34 as it is. Then, the function executing unit 34 executes the process intended by the operation that is performed on the input device 1 by the user (step ST7).

Subsequently, the display control unit 35 updates the display image on the display 4 depending on the process performed by the function executing unit 34 (step ST8).

Contrarily, when the number of detected touch points which are touched by the input device 1 with which the finger is in contact is not equal to the required number (NO in step ST6), the operation determining unit 33 selects one or more touch points touched by fingers to be regarded as points from which touches are released, the number of the selected touch points being equal to the number of touch points which are touched by the input device 1 and have not been detected (step ST9).

Then, the operation determining unit 33 determines that the touch points touched by the fingers selected in step ST9 are points where touches are to become ineffective, and regards the touch points as points from which touches are released (step ST10). The operation determining unit 33 notifies the function executing unit 34 of the touch points regarded as points from which touches are released in step ST10.

In addition, the touch points regarded as points from which touches are released in step ST10 are notified from the operation determining unit 33 to the touch information acquiring unit 31. The flowchart of FIG. 5 is performed periodically. When the process returns to step ST1 again after step ST10, in the next step ST2, the touch information acquiring unit 31 excludes the touch points regarded as points from which touches are released in step ST10 from targets of detection of the position or the like. Therefore, touch points the number of which is equal to the required number, and which are touched by the input device 1 with which the finger is in contact are detected.

In this manner, input operation using the input device 1 is preferentially accepted.

For example, let us assume that the display input device 10 is mounted on a vehicle and that the audio volume is at its maximum and is quite loud. The driver, who is the user, cannot concentrate on driving because of the volume. Known as conventional in-vehicle devices are devices in which the function of volume control is assigned to a software key by a touch panel, the devices including a button as a hardware key for volume control in consideration of a possibility that volume control cannot be performed by the software key due to an effective upper limit number. Such button is often provided on the front panel of the in-vehicle device. Contrarily, in the display input device 10 according to the first embodiment, volume control by the hardware key of the input device 1 is prioritized even when there are touch points the number of which exceeds the effective upper limit number, and thus it is not necessary to adopt such a structure in which a button for volume control is provided on the front panel or the like in consideration of the effective upper limit number.

Figure 6A:
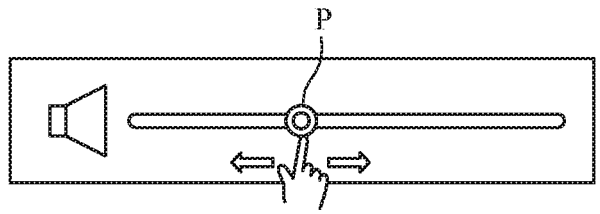
FIGS. 6A and 6B are diagrams illustrating examples of a software key to which the function of volume control is assigned.
Figure 6B:
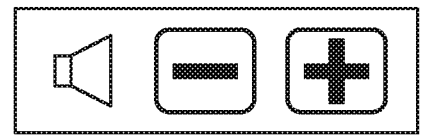

As a software key by a touch panel, for example icons as illustrated in FIGS. 6A and 6B are known as software keys to which the function of volume control is assigned. When a user operates the software keys as illustrated in FIGS. 6A and 6B, parts other than the icon are touched, the sliding direction of the control pin P shifts, or other disadvantages occur unless the user operates while looking at the icon. However, the user cannot carefully look at the icon while driving, and thus it is difficult to operate the software key. Contrarily, since the display input device 10 of the first embodiment can be operated by the input device 1, it is possible to eliminate the software keys as illustrated in FIGS. 6A and 6B and thereby improve the flexibility of the display layout.

If a process corresponding to operation is not executed even when the input device 1 is operated, there are cases where the user mistakenly thinks that there is a poor contact between the input device 1 and the touch panel 2. Then, the user strongly presses the input device 1 against the touch panel 2, thus leading to failures of the display 4 and the input device 1. In the display input device 10 according to the first embodiment, since input operation using the input device 1 is prioritized over input operation by a finger, it is possible to prevent misunderstanding of a user, a failure of the display 4, and a failure of the input device 1.

Note that it is assumed in the above description that the touch information acquiring unit 31 detects the positions or the likes of touch points only up to the same number as the effective upper limit number. However, the touch information acquiring unit 31 may acquire touch information by detecting the positions or the likes of all the touch points on the touch panel 2. In this case, the touch means determining unit 32 determines what means is used for all the touch points on the touch panel 2. Then, the operation determining unit 33 performs the process of extracting, from the touch information acquired by the touch information acquiring unit 31, all touch points touched by the input device 1 with which a finger is in contact and touch points by fingers within the effective upper limit number, and determining that all other touch points are points where touches are to become ineffective and regarding the all other touch points as points from which touches are released.

As described above, according to the first embodiment, input operation using the input device 1 can be prioritized in a case where there are touch points the number of which exceeds the effective upper limit number.

Second Embodiment

Figure 7:
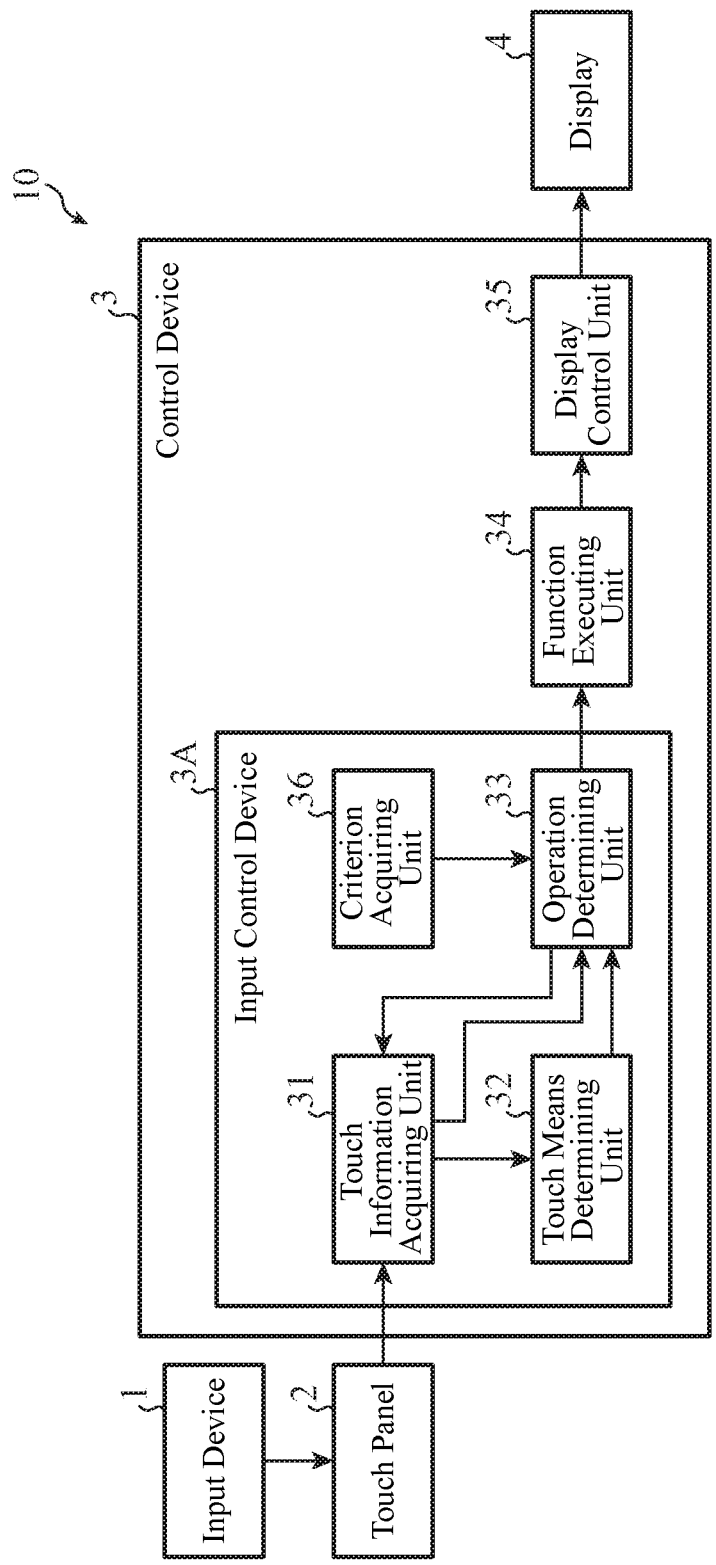
FIG. 7 is a diagram illustrating a configuration of a display input device according to a second embodiment.

FIG. 7 is a diagram illustrating a configuration of a display input device 10 according to a second embodiment.

The display input device 10 according to the second embodiment is different from the display input device 10 according to the first embodiment in that a criterion acquiring unit 36 is included. The same reference numerals are given to components having functions which are the same as or corresponding to those of components already described in the first embodiment, and description thereof will be omitted or simplified in the second embodiment.

The criterion acquiring unit 36 acquires a criterion for a touch point which is touched by a finger, and which is determined to be a point where a touch is to become ineffective and regarded as a point from which a touch is released. In the following, the "criterion for a touch point which is touched by a finger, and which is determined to be a point where a touch is to become ineffective and regarded as a point from which a touch is released" is simply referred to as "the criterion". The criterion is, for example, stored in advance in a storage unit (not illustrated) and is read by the criterion acquiring unit 36. The criterion acquiring unit 36 outputs the acquired criterion to an operation determining unit 33.

Note that it is preferable that there are multiple types of criteria that can be stored in the storage unit (not illustrated), and that a user can select and set. Specific contents of the criteria will be described in third to sixth embodiments described later.

When it is necessary to determine that some touch points are points where touches are to become ineffective and regard the some touch points as points from which touches are released, the operation determining unit 33 uses the criterion output by the operation determining unit 33 to select touch points to be regarded as points from which touches are released.

The criterion acquiring unit 36 is implemented by a similar hardware configuration to that described in the first embodiment by referring to FIGS. 3A and 3B.

As described above, according to the display input device 10 according to the second embodiment, in addition to the effect of the first embodiment, a touch point can be selected which is determined to be a point where a touch is to become ineffective and regarded as a point from which a touch is released in accordance with a criterion that matches a user's preference.

Third Embodiment

In a third embodiment, a case will be described in which a criterion acquired by a criterion acquiring unit 36 is that a touch point touched earlier is determined to be a point where a touch is to become ineffective earlier and regarded as a point from which a touch is released.

For the configuration of a display input device 10 according to the third embodiment, FIG. 7 is referred to.

Figure 8A:
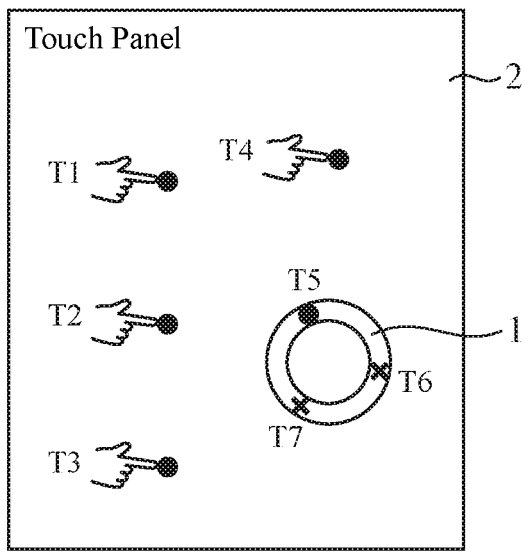
FIGS. 8A and 8B are diagrams for explaining the outline of processes of a third embodiment.
Figure 8B:
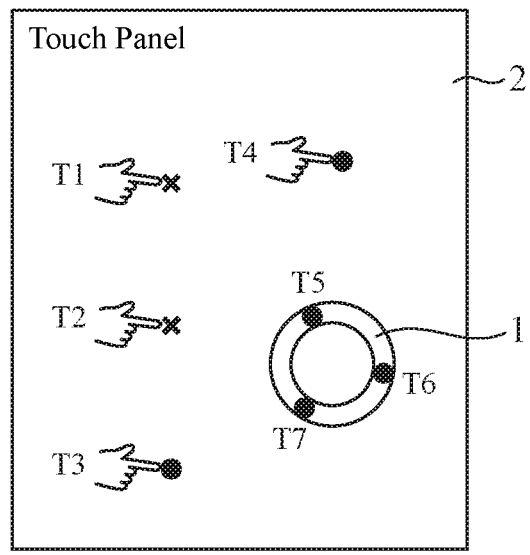

FIGS. 8A and 8B are diagrams for explaining the outline of processes by a touch information acquiring unit 31, a touch means determining unit 32, and an operation determining unit 33 of the third embodiment. An example will be described in which the effective upper limit number is five, that is, touches up to five points are effective in the display input device 10.

When a user places a hand on an input device 1 while there are touch points T1 to T4 touched by fingers as illustrated in FIG. 8A, only a touch point T5 among touch points T5 to T7 formed by the input device 1 is detected first and becomes a point where a touch is effective. It is further assumed that the touch points T1 to T4 touched by the fingers are touched in the order of the touch point T1, the touch point T2, the touch point T3, and then the touch point T4.

At this time, the touch means determining unit 32 determines that the touch point T5 is touched by the input device 1 with which a finger is in contact.

Then, the operation determining unit 33 determines that touch points touched earlier among the touch points T1 to T4, that is, the touch points T1 and T2 are points where touches are to become ineffective, and regards the touch points T1 and T2 as points from which touches are released, in order to accept input operation using the input device 1. As a result, as illustrated in FIG. 8B, all touch points T5 to T7 formed by the input device 1 are detected and become points where touches are effective, and thereby input operation using the input device 1 becomes accepted.

As described above, according to the display input device 10 according to the third embodiment, in addition to the effects of the first embodiment, when input operation using the input device 1 is prioritized, touch operation by a finger immediately before can be continued.

Fourth Embodiment

In a fourth embodiment, a case will be described in which a criterion acquired by a criterion acquiring unit 36 is that a touch point touched later is determined to be a point where a touch is to become ineffective earlier and regarded as a point from which a touch is released.

For the configuration of a display input device 10 according to the fourth embodiment, FIG. 7 is referred to.

Figure 9A:
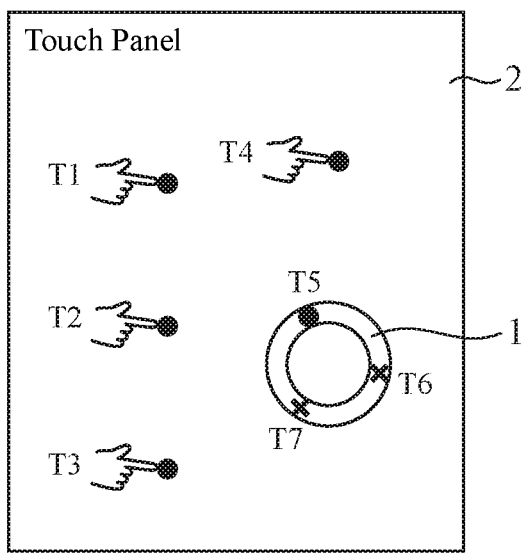
FIGS. 9A and 9B are diagrams for explaining the outline of processes of a fourth embodiment.
Figure 9B:
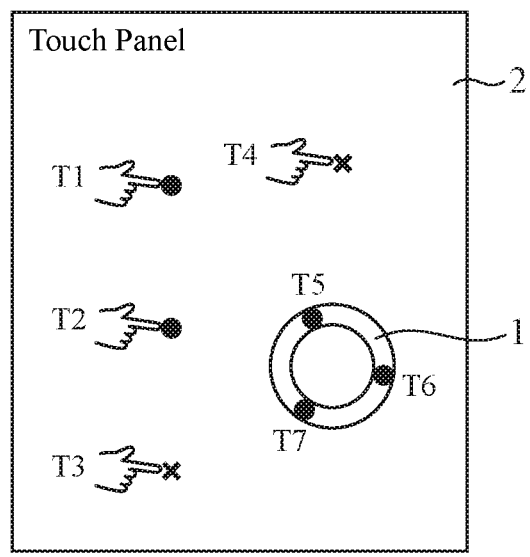

FIGS. 9A and 9B are diagrams for explaining the outline of processes by a touch information acquiring unit 31, a touch means determining unit 32, and an operation determining unit 33 of the fourth embodiment. An example will be described in which the effective upper limit number is five, that is, touches up to five points are effective in the display input device 10.

When a user places a hand on an input device 1 while there are touch points T1 to T4 touched by fingers as illustrated in FIG. 9A, only a touch point T5 among touch points T5 to T7 formed by the input device 1 is detected first and becomes a point where a touch is effective. It is further assumed that the touch points T1 to T4 touched by the fingers are touched in the order of the touch point T1, the touch point T2, the touch point T3, and then the touch point T4.

At this time, the touch means determining unit 32 determines that the touch point T5 is touched by the input device 1 with which a finger is in contact.

Then, the operation determining unit 33 determines that touch points touched later among the touch points T1 to T4, that is, the touch points T3 and T4 are points where touches are to become ineffective, and regards the touch points T3 and T4 as points from which touches are released, in order to accept input operation using the input device 1. As a result, as illustrated in FIG. 9B, all touch points T5 to T7 formed by the input device 1 are detected and become points where touches are effective, and thereby input operation using the input device 1 becomes accepted.

As described above, according to the display input device 10 according to the fourth embodiment, in addition to the effects of the first embodiment, when input operation using the input device 1 is prioritized, touch operation by a finger first performed can be continued.

Fifth Embodiment

In a fifth embodiment, a case will be described in which a criterion acquired by a criterion acquiring unit 36 is that a touch point having lower electrostatic capacitance is determined to be a point where a touch is to become ineffective earlier and regarded as a point from which a touch is released.

For the configuration of a display input device 10 according to the fifth embodiment, FIG. 7 is referred to.

Figure 10A:
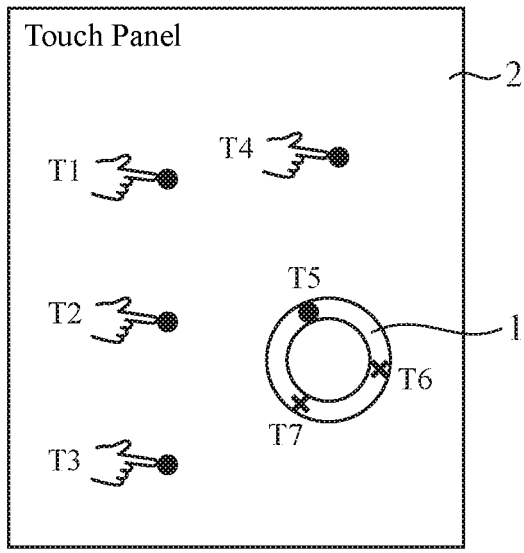
FIGS. 10A and 10B are diagrams for explaining the outline of processes of a fifth embodiment.
Figure 10B:
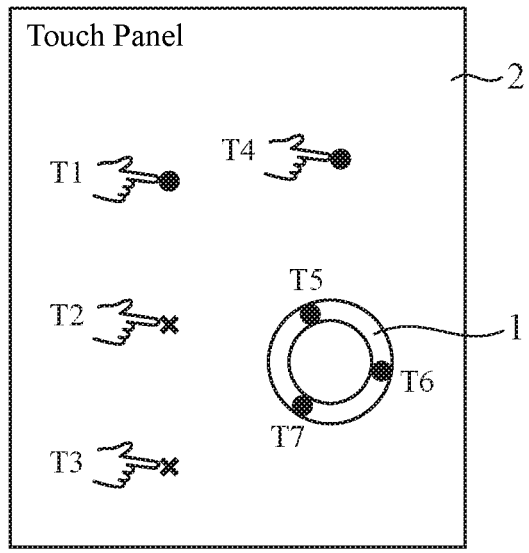

FIGS. 10A and 10B are diagrams for explaining the outline of processes by a touch information acquiring unit 31, a touch means determining unit 32, and an operation determining unit 33 of the fifth embodiment. An example will be described in which the effective upper limit number is five, that is, touches up to five points are effective in the display input device 10.

When a user places a hand on an input device 1 while there are touch points T1 to T4 touched by fingers as illustrated in FIG. 10A, only a touch point T5 among touch points T5 to T7 formed by the input device 1 is detected first and becomes a point where a touch is effective.

At this time, the touch means determining unit 32 determines that the touch point T5 is touched by the input device 1 with which a finger is in contact.

Figure 10C:
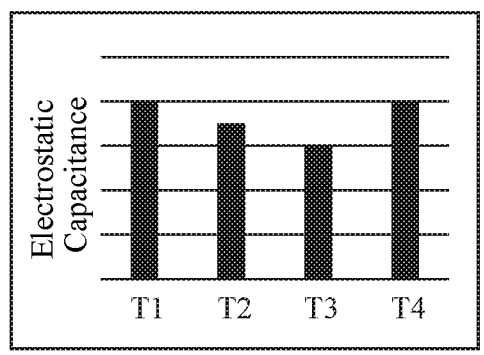
FIG. 10C is a graph illustrating the magnitude relationship between electrostatic capacitances.

Then, the operation determining unit 33 determines touch points which are points where touches are to become ineffective in ascending order of electrostatic capacitance among the touch points T1 to T4 touched by fingers, and regards the determined touch points as points from which touches are released, in order to accept input operation using the input device 1. The operation determining unit 33 uses touch information output by the touch information acquiring unit 31 to specify the magnitude relationship between electrostatic capacitances of the touch points T1 to T4 as illustrated in FIG. 10C, for example. In the example illustrated in FIG. 10C, the operation determining unit 33 determines that the touch points T2 and T3 are points where touches are to become ineffective, and regards the touch points T2 and T3 as points from which touches are released. As a result, as illustrated in FIG. 10B, all touch points T5 to T7 formed by the input device 1 are detected and become points where touches are effective, and thereby input operation using the input device 1 becomes accepted.

As described above, according to the display input device 10 according to the fifth embodiment, in addition to the effects of the first embodiment, when input operation using the input device 1 is prioritized, touch operation that is pressed hard can be continued. Thus, a user can indicate touch operation by a finger that the user wants to continue using touch strength.

Sixth Embodiment

In a sixth embodiment, a case will be described in which a criterion acquired by a criterion acquiring unit 36 is that a touch point in a portion where a touch is ineffective is regarded as a point from which a touch is released earlier.

For the configuration of a display input device 10 according to the sixth embodiment, FIG. 7 is referred to.

Figure 11A:
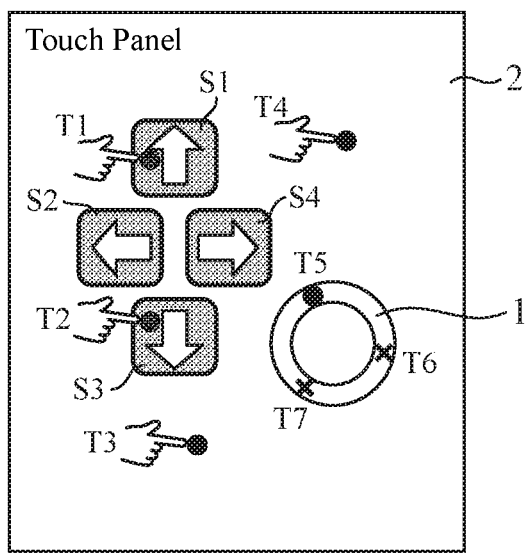
FIGS. 11A and 11B are diagrams for explaining the outline of processes of a sixth embodiment.
Figure 11B:
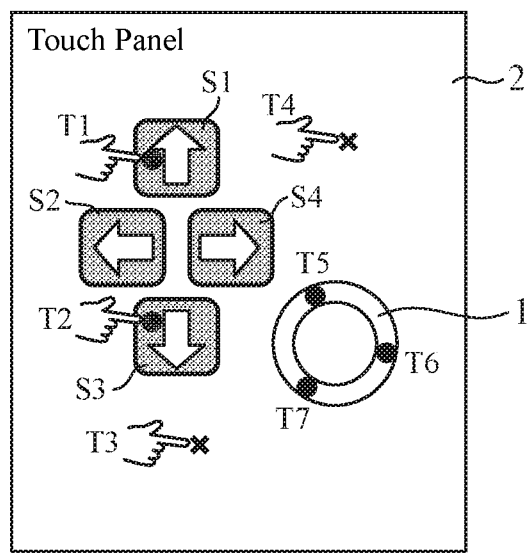

FIGS. 11A and 11B are diagrams for explaining the outline of processes by a touch information acquiring unit 31, a touch means determining unit 32, and an operation determining unit 33 of the sixth embodiment. An example will be described in which the effective upper limit number is five, that is, touches up to five points are effective in the display input device 10.

When a user places a hand on an input device 1 while there are touch points T1 to T4 touched by fingers as illustrated in FIG. 11A, only a touch point T5 among touch points T5 to T7 formed by the input device 1 is detected first and becomes a point where a touch is effective.

At this time, the touch means determining unit 32 determines that the touch point T5 is touched by the input device 1 with which a finger is in contact.

Then, the operation determining unit 33 determines touch points which are points where touches are to become ineffective, first from touch points located in a portion where a touch is ineffective among the touch points T1 to T4 touched by fingers, and regards the determined touch points as points from which touches are released, in order to accept input operation using the input device 1. The portion where a touch is ineffective refers to a portion other than software keys S1 to S4 illustrated in FIG. 11A. The operation determining unit 33 may acquire information indicating where the portion where a touch is ineffective is from a display control unit 35. In the case of FIG. 11A, the operation determining unit 33 determines that the touch points T3 and T4 are points where touches are to become ineffective, and regards the touch points T3 and T4 as points from which touches are released. As a result, as illustrated in FIG. 11B, all touch points T5 to T7 formed by the input device 1 are detected and become points where touches are effective, and thereby input operation using the input device 1 becomes accepted.

As described above, according to the display input device 10 according to the sixth embodiment, in addition to the effects of the first embodiment, when input operation using the input device 1 is prioritized, touch operation by a finger performing meaningful operation, such as touching a software key, can be continued.

Seventh Embodiment

In a seventh embodiment, a mode will be described in which a touch point touched by a finger is determined to be a point where a touch is to become ineffective and regarded as a point from which a touch is released in a case where a priority instruction operation is performed on an input device 1.

For the configuration of a display input device 10 according to the seventh embodiment, FIG. 1 is referred to.

In a case where a touch means determining unit 32 determines that there is a touch point touched by the input device 1 with which a finger is in contact, and the total number of touch points on a touch panel 2 exceeds an effective upper limit number, an operation determining unit 33 does not determine that a touch point touched by a finger is a point where a touch is to become ineffective until a priority instruction operation is performed on the input device 1.

Figure 12A:
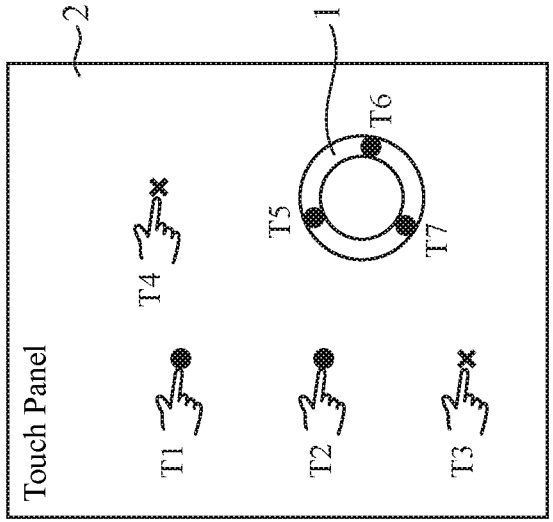
FIGS. 12A, 12B, and 12C are diagrams for explaining the outline of processes of a seventh embodiment.
Figure 12B:
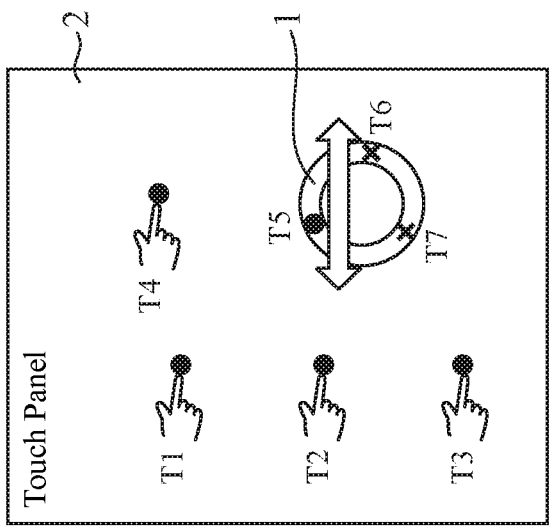
Figure 12C:
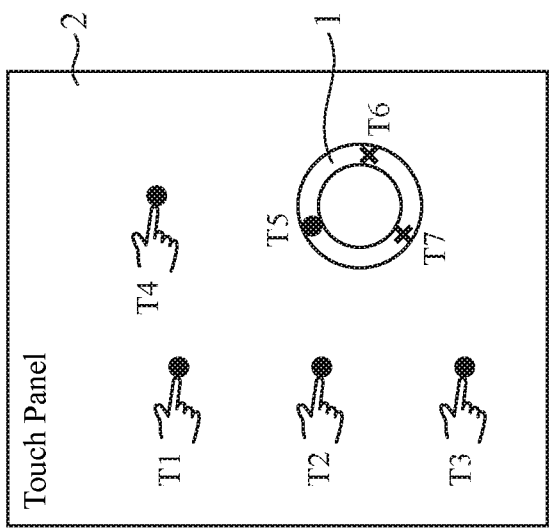

FIGS. 12A, 12B, and 12C are diagrams for explaining the outline of processes by a touch information acquiring unit 31, the touch means determining unit 32, and the operation determining unit 33 of the seventh embodiment. An example will be described in which the effective upper limit number is five, that is, touches up to five points are effective in the display input device 10.

When a user places a hand on the input device 1 while there are touch points T1 to T4 touched by fingers as illustrated in FIG. 12A, only a touch point T5 among touch points T5 to T7 formed by the input device 1 is detected first and becomes a point where a touch is effective.

At this time, the touch means determining unit 32 determines that the touch point T5 is touched by the input device 1 with which a finger is in contact.

Meanwhile, when operation of shaking the input device 1 on the touch panel 2 is performed on the input device 1 as illustrated in FIG. 12B, this operation is determined to be the priority instruction operation, and thus the operation determining unit 33 determines that the touch points T3 and T4 are points where touches are to become ineffective and regards the touch points T3 and T4 as points from which touches are released. Note that the operation determining unit 33 may determine that the input device 1 is shaken on the touch panel 2 by monitoring touch information output by the touch information acquiring unit 31.

As a result, as illustrated in FIG. 12C, all touch points T5 to T7 formed by the input device 1 are detected and become points where touches are effective, and thereby input operation using the input device 1 becomes accepted.

Note that, in the description using FIGS. 12A, 12B, and 12C, it is assumed that the operation of shaking the input device 1 on the touch panel 2 is the priority instruction operation. However, other operation such as moving the input device 1 in a circle on the touch panel 2 may be the priority instruction operation. Which operation is to be regarded as the priority instruction operation is, for example, preset by a user.

Figure 13:
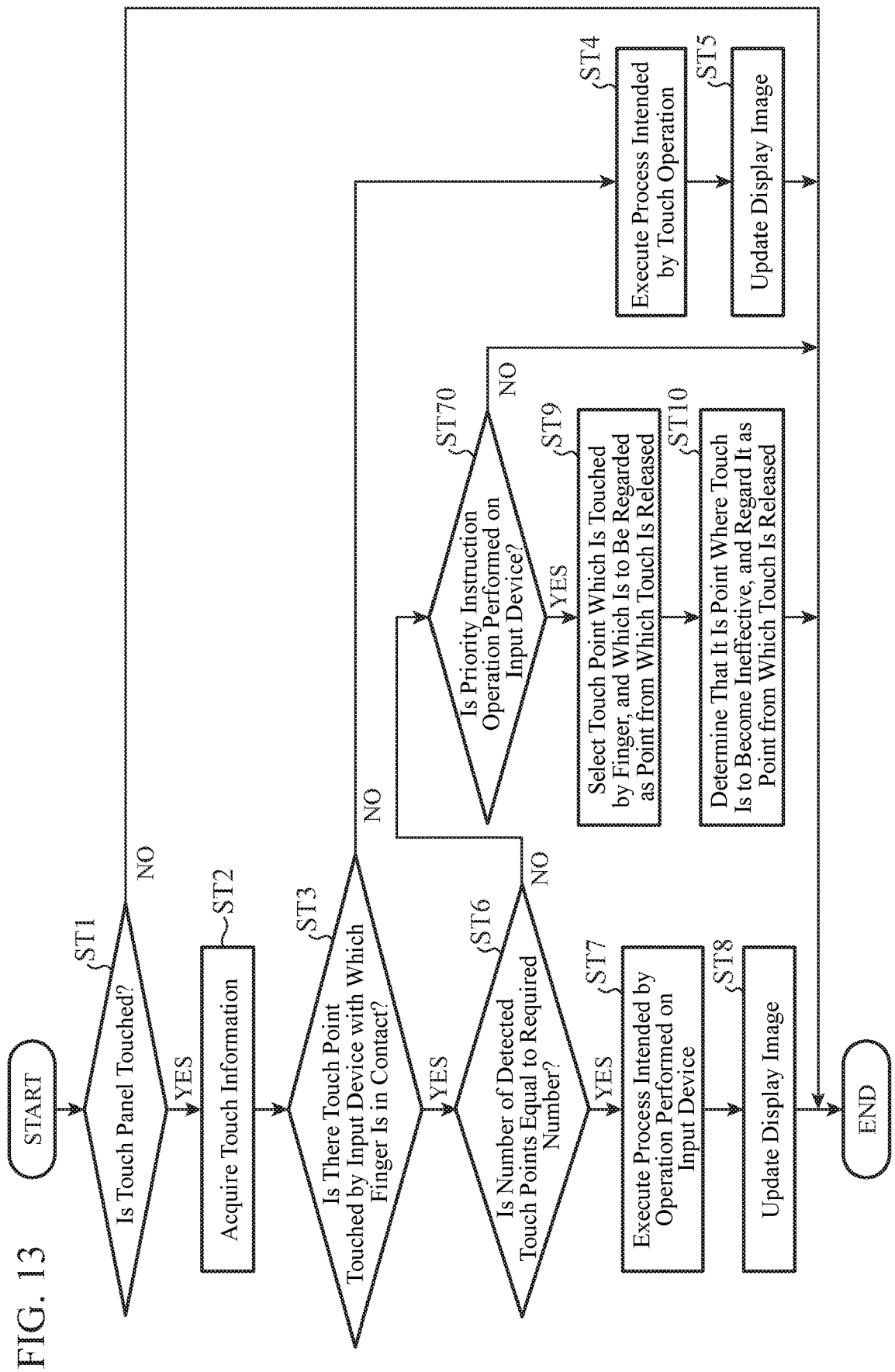
FIG. 13 is a flowchart illustrating an example of processes performed by a control device of the seventh embodiment.

Next, an example of the process by a control device 3 of the seventh embodiment will be described using a flowchart illustrated in FIG. 13. Note that steps performing processes which are the same as or equivalent to those of steps already described by referring to FIG. 5 are denoted by the same reference numerals, and description thereof will be omitted or simplified as appropriate.

When the number of detected touch points which are touched by the input device 1 with which a finger is in contact is not equal to the required number (NO in step ST6), the operation determining unit 33 determines whether the priority instruction operation is performed on the input device 1 (step ST70).

When the priority instruction operation is performed on the input device 1 (YES in step ST70), the process of step ST9 described in the first embodiment is performed.

On the other hand, when no priority instruction operation is performed on the input device 1 (NO in step ST70), the process ends without a process in which the operation determining unit 33 determines that a touch point touched by a finger is a point where a touch is to become ineffective and regards the touch point as a point from which a touch is released.

As described above, according to the display input device 10 of the seventh embodiment, input operation using the input device 1 is prioritized only when a user performs the priority instruction operation on the input device 1. Therefore, it is possible to prevent a touch point touched by a finger from being regarded as a point from which a touch is released when the user mistakenly places a hand on the input device 1.

Eighth Embodiment

In an eighth embodiment, a mode will be explained in which an upper limit is set for the number of touch points which are touched by fingers, and which are set as points where touches are effective.

For the configuration of a display input device 10 according to the eighth embodiment, FIG. 1 is referred to.

Figure 14A:
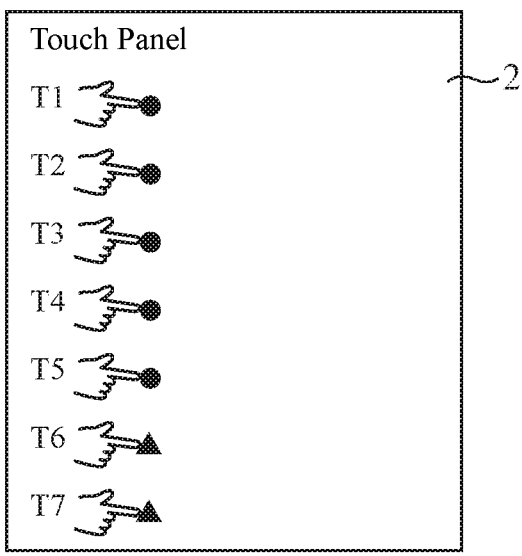
FIGS. 14A and 14B are diagrams for explaining the outline of processes of an eighth embodiment.
Figure 14B:
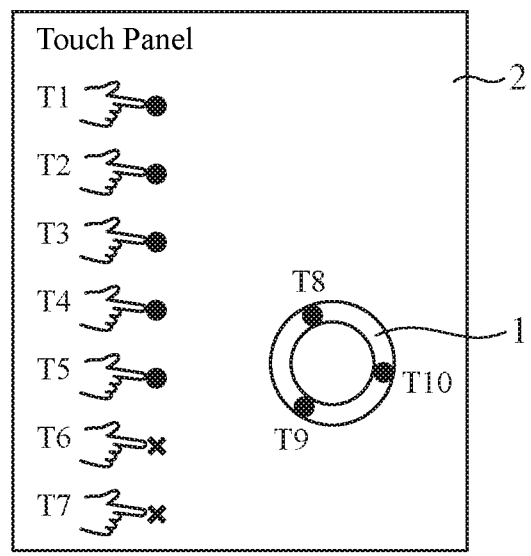

FIGS. 14A and 14B are diagrams for explaining the outline of processes by a touch information acquiring unit 31, a touch means determining unit 32, and an operation determining unit 33 of the eighth embodiment. An example will be described in which an effective upper limit number is eight, that is, touches up to eight points are effective in the display input device 10. In addition, it is assumed that a setting is applied in which up to five touch points touched by fingers can be set as points where touches are effective. The setting which defines up to how many touch points touched by fingers are set as points where touches are effective may be changed by a user.

As illustrated in FIG. 14A, in a state where there are touch points T1 to T7 touched by fingers, the touch information acquiring unit 31 detects the touch points T1 to T7. At this time, the touch means determining unit 32 determines that the touch points T1 to T7 are touched by fingers.

Of the touch points T1 to T7, the operation determining unit 33 sets only five touch points as points where touches are effective and does not set the remaining two touch points as points where touches are effective. More specifically, although the remaining two touch points are not set as points where touches are ineffective, they are not reflected in a process by a function executing unit 34 and enter a so-called unused state.

When a user places a hand on an input device 1 on a touch panel 2 in the state illustrated in FIG. 14A, only one of multiple touch points formed by the input device 1 is detected by the touch information acquiring unit 31 and becomes a point where a touch is effective. The touch means determining unit 32 determines that this single point detected by the touch information acquiring unit 31 is touched by the input device 1 with which a finger is in contact.

However, since the number of detected touch points which are touched by the input device 1 with which the finger is in contact is not equal to the required number, the operation determining unit 33 sets, as points where touches are ineffective, the two touch points that are not set as points where touches are effective out of the touch points T1 to T7 touched by fingers. As a result, as illustrated in FIG. 14B, all touch points T8 to T10 formed by the input device 1 are detected and become points where touches are effective, and thereby input operation using the input device 1 becomes accepted.

Note that, in the above, the number obtained by subtracting the required number of touch points touched by the input device 1 (three in FIGS. 14A and 14B) from the effective upper limit number (eight in FIGS. 14A and 14B) is set as the upper limit number of touch points which are touched by fingers, and which are set as points where touches are effective. However, a number less than the number obtained by subtracting the required number of touch points touched by the input device 1 from the effective upper limit number may be set as the upper limit number of the touch points which are touched by fingers, and which are set as points where touches are effective. With this configuration, it becomes possible to use multiple input devices 1 by, for example, further placing a second input device 1 on the touch panel 2 and causing input operation using the second input device 1 to be prioritized over input operation by a finger as described in the first to sixth embodiments.

In short, the operation determining unit 33 is only required to set, as points where touches are effective, only touch points which are touched by fingers, and the number of which is less than or equal to the number obtained by subtracting the number of touch points to be formed by the input device 1 from the effective upper limit number, and to set, as points where touches are ineffective, touch points that are not set as points where touches are effective among touch points touched by fingers in a case where the touch means determining unit 32 determines that there is a touch by the input device 1 with which a finger is in contact.

As described above, according to the display input device 10 of the eighth embodiment, input operation using the input device 1 can be prioritized in a case where there are touch points the number of which exceeds the effective upper limit number. Moreover, a touch point which is touched by a finger, and which becomes ineffective when the input operation using the input device 1 is prioritized, has not been effective in the first place. Therefore, even when the input operation using the input device 1 is prioritized, touch operation by a finger that has been performed previously is continued without being affected.

Note that, within the scope of the present invention, the invention of the present application may include a flexible combination of the embodiments, a modification of any component of the embodiments, or an omission of any component in the embodiments.

INDUSTRIAL APPLICABILITY

As described above, the input control device according to the present invention can prioritize input operation using the input device in a case where there are touch points the number of which exceeds the effective upper limit number, and thus is suitable for use by incorporation, for example, in an in-vehicle display input device including a touch panel.

REFERENCE SIGNS LIST

1: input device, 2: touch panel, 3: control device, 3A: input control device, 4: display, 10: display input device, 11: outer circumferential conductive portion, 12: bottom plate, 13: conductive column, 14: axial center, 15: hollow portion, 31: touch information acquiring unit, 32: touch means determining unit, 33: operation determining unit, 34: function executing unit, 35: display control unit, 36: criterion acquiring unit, 100: processing circuit, 101: memory, 102: CPU

The invention claimed is:

1. An input control device for controlling acceptance of input operation via a touch panel on which an input device for forming multiple touch points is placed, the input control device comprising:
   processing circuitry
   to acquire touch information including one or more positions of respective touch points and one or more electrostatic capacitances of the respective touch points;
   to determine whether each of the touch points is touched by a finger or by the input device with which a finger is in contact using the touch information, and thereby determine whether there is a touch point touched by the input device with which the finger is in contact; and
   to, in a case where it is determined that there is a touch point touched by the input device with which the finger is in contact and a total number of touch points on the touch panel exceeds an effective upper limit number, determine that one or more touch points touched by respective fingers are points where respective touches are to become ineffective, and regard the one or more touch points as points from which respective touches are released, the number of the one or more touch points being equal to an excess number by which the total number exceeds the effective upper limit number.

2. The input control device according to claim 1, wherein the processing circuitry acquires a criterion for the one or more touch points which are touched by the respective fingers, and which are determined to be the points where the respective touches are to become ineffective and regarded as the points from which the respective touches are released, and the processing circuitry selects the one or more touch points which are determined to be the points where the respective touches are to become ineffective using the criterion.

3. The input control device according to claim 2, wherein the criterion is that a touch point touched earlier is determined to be a point where a touch is to become ineffective earlier.

4. The input control device according to claim 2, wherein the criterion is that a touch point touched later is determined to be a point where a touch is to become ineffective earlier.

5. The input control device according to claim 2, wherein the criterion is that a touch point having lower electrostatic capacitance is determined to be a point where a touch is to become ineffective earlier.

6. The input control device according to claim 2, wherein the criterion is that a touch point in a portion where a touch is ineffective is determined to be a point where a touch is to become ineffective earlier.

7. The input control device according to claim 1, wherein the processing circuitry performs a process of determining that the one or more touch points which are touched by the respective fingers, and the number of which is equal to the excess number are the points where the respective touches are to become ineffective, and regarding the one or more touch points as the points from which the respective touches are released, in a case where a priority instruction operation is performed on the input device.

8. An input control device for controlling acceptance of input operation via a touch panel on which an input device for forming multiple touch points is placed, the input control device comprising:

processing circuitry to acquire touch information including one or more positions of respective touch points and one or more electrostatic capacitances of the respective touch points;

to determine whether each of the touch point is touched by a finger or by the input device with which a finger is in contact using the touch information, and thereby determine whether there is a touch point touched by the input device with which the finger is in contact; and to set, as points where respective touches are effective, only one or more touch points which are touched by respective fingers, and the number of which is less than or equal to a number obtained by subtracting the number of the multiple touch points to be formed by the input device from an effective upper limit number, and, in a case where it is determined that there is a touch point touched by the input device with which the finger is in contact, set, as a point where a touch is ineffective, a touch point which is not set as one of the points where the respective touches are effective among touch points touched by respective fingers.

9. An input control method for controlling acceptance of input operation via a touch panel on which an input device for forming multiple touch points is placed, the input control method comprising:

touch information including one or more positions of respective touch points and one or more electrostatic capacitances of the respective touch points;

whether each of the touch points is touched by a finger or by the input device with which a finger is in contact using the touch information, and thereby determining whether there is a touch point touched by the input device with which the finger is in contact; and in a case where it is determined that there is a touch point touched by the input device with which the finger is in contact and a total number of touch points on the touch panel exceeds an effective upper limit number, determining, that one or more touch points touched by respective fingers are points where respective touches are to become ineffective, and regarding the one or more touch points as points from which respective touches are released, the number of the one or more touch points being equal to an excess number by which the total number exceeds the effective upper limit number.

* * * * *